US006810866B2

(12) United States Patent
Geiser

(10) Patent No.: US 6,810,866 B2
(45) Date of Patent: Nov. 2, 2004

(54) ENGINE WITH MODIFIED CAM PROFILES FOR INTERNAL EGR CONTROL

(75) Inventor: Brian W. Geiser, Shelby Township, MI (US)

(73) Assignee: General Motors Corporation, Detroit, MI (US)

( * ) Notice: Subject to any disclaimer, the term of this patent is extended or adjusted under 35 U.S.C. 154(b) by 50 days.

(21) Appl. No.: 10/277,359

(22) Filed: Oct. 22, 2002

(65) Prior Publication Data

US 2004/0074481 A1 Apr. 22, 2004

(51) Int. Cl.$^7$ .............................................. F02M 25/07
(52) U.S. Cl. ............................. 123/568.14; 123/90.15
(58) Field of Search ......................... 123/568.14, 90.15

(56) References Cited

U.S. PATENT DOCUMENTS 5,927,238 A * 7/1999 Watson .................. 123/568.14

* cited by examiner

Primary Examiner—Mahmoud Gimie
Assistant Examiner—Arnold Castro
(74) Attorney, Agent, or Firm—Karl F. Barr, Jr.

(57) ABSTRACT

An engine includes cams for actuating intake and exhaust valves controlling transport of air and combustion products to and from a combustion chamber of the engine. The cams have valve opening and closing curves capable of being timed so that the intake valve opening curve partially overlaps the exhaust valve closing curve, allowing retention of some combustion products in the combustion chamber with an incoming air charge. At least one of the cams has variable timing to vary the valve overlap for controlling the amount of exhaust gas retention or recirculation (EGR). The overlapping portions of the cam opening and closing curves are extended to provide a relatively linear variation in valve overlap area over the range of cam variable timing. Thus, variation of exhaust gas retention in the combustion chamber becomes a relatively constant function of the duration of valve overlap in each engine cycle and control of the amount of EGR is improved.

6 Claims, 4 Drawing Sheets

ENGINE WITH MODIFIED CAM PROFILES FOR INTERNAL EGR CONTROL

TECHNICAL FIELD

This invention relates to valve trains for internal combustion engines and more particularly to modified cam overlap profiles for control of internal exhaust gas recirculation or retention (EGR).

BACKGROUND OF THE INVENTION

It is known in the automotive engine art to provide an engine having one or more cylinders with dual camshafts, one for actuating the engine intake valves and a second camshaft for actuating the engine exhaust valves. It is also known to provide a cam phaser or camshaft timing adjuster on one or both of the camshafts for adjusting within predetermined ranges the angular positions or phases of the camshafts relative to the engine crankshaft. A known arrangement is to mount a single cam phaser on the exhaust camshaft of the engine, although dual phasers may be utilized if desired.

In the referenced arrangement, the exhaust cam phaser adjusts timing of the exhaust camshaft during engine operation to vary the amount of EGR remaining in the engine combustion chambers during the compression and combustion processes. Dilution of the fresh air charges by exhaust gas during certain operating conditions of the engine is utilized to reduce the output of oxides of nitrogen (NOx) and to increase fuel economy. The variation in internal EGR is accomplished by increasing or decreasing the overlap of the exhaust valve closing motion and the intake valve opening motion by varying the relative timing of their cam profiles which actuate the valves through adjustment of the angular position of one or both of the camshafts.

In general, it is desired to dilute the engine cylinder charges with substantial amounts of retained exhaust gas. However, the amount of dilution must be controlled below an amount which will cause instability in the combustion process and adversely affect operation of the engine. Thus, the amount of overlap allowed during various engine operating conditions must be established by calibration to avoid worst case operating conditions which might cause instability.

SUMMARY OF THE INVENTION

The present invention results in part from a recognition that the problem of accurately controlling exhaust dilution by varying cam timing is made more difficult by the shape of the lift curves of the ordinary intake and exhaust valve cams. In general, both types of cams begin and end their opening and closing curves with relatively shallow ramps and acceleration or deceleration zones. In between, the curves accelerate and decelerate in more or less exponential fashion. Thus, with normal valve overlap, where increased cylinder charge dilution is not desired, the shallow deceleration portion of the exhaust valve overlaps the shallow acceleration portion on the intake valve for a relatively short distance, providing a relatively small maximum area of valve overlap and thus a small amount of dilution.

As the exhaust cam, for example, is retarded by the cam phaser, the overlapping portions of the lift curves quickly move into the exponential closing and opening portions of the exhaust and inlet cam profiles. The maximum overlap area accordingly rises quickly to a much greater amount than is initially available, so that a large change in the overlap area occurs with a relatively small motion of the cam phaser. This makes accurate control of the amount of EGR in the cylinders difficult and requires that the calibration settings be backed off for all engines to a position where none of the engines will operate in an unstable combustion condition even through there may be considerable variation in the amount of dilution occurring in the respective engines.

The present invention solves the problem by providing modified cam profiles which alter the rate of change of valve overlap area as the cam phase, or angular position, is adjusted over the range of cam phaser travel so that the total valve overlap area varies in a relatively linear manner as adjustment of the cam phase changes the duration of valve overlap. In this way, the more or less exponential relationship of EGR flow to cam phaser travel is replaced by a more linear relationship. Thus, the variation of exhaust gas retention in the combustion chamber becomes a relatively linear function of the duration of valve overlap in each engine cycle and control of the amount of EGR is improved These and other features and advantages of the invention will be more fully understood from the following description of certain specific embodiments of the invention taken together with the accompanying drawings.

DESCRIPTION OF THE PREFERRED EMBODIMENT

Figure 1:
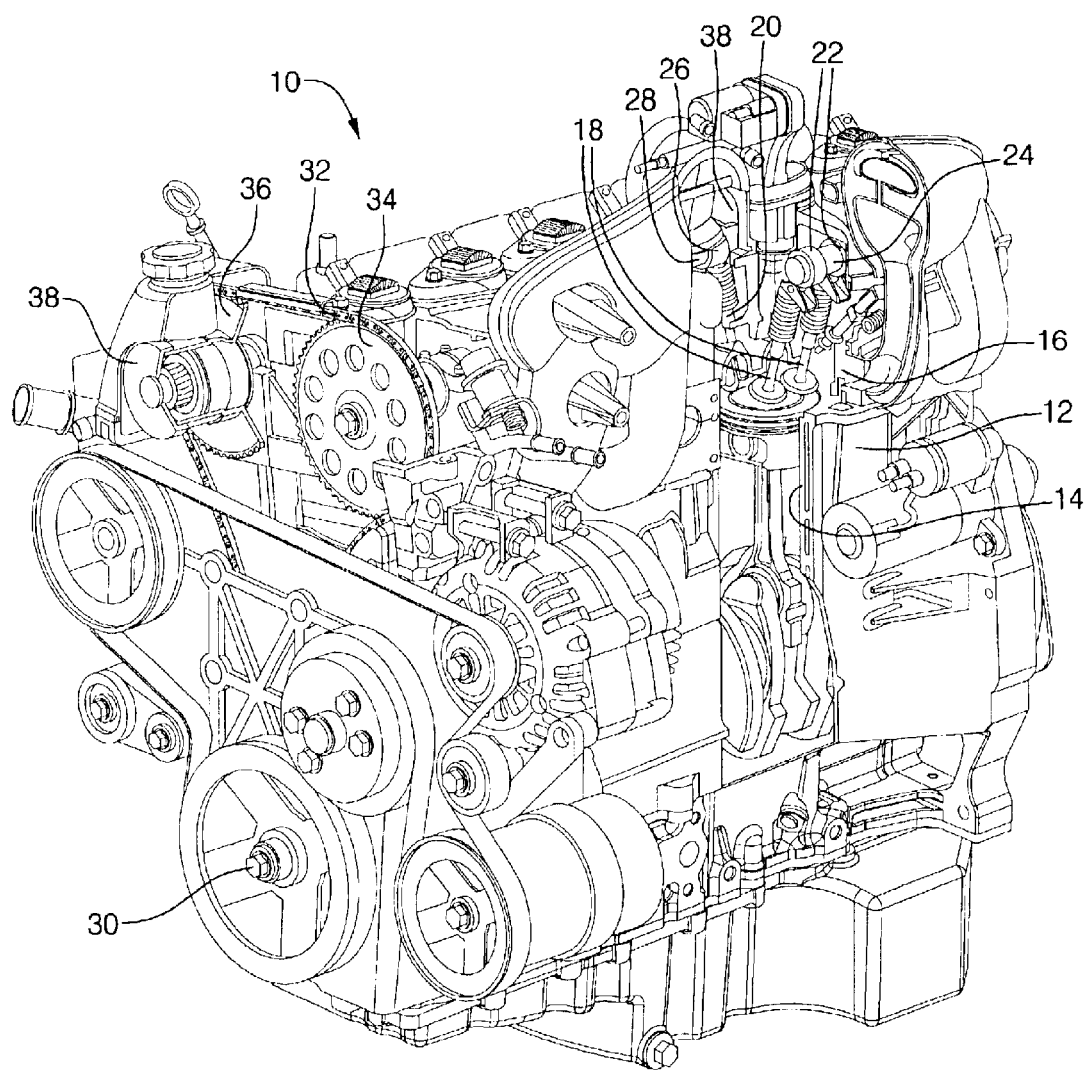
FIG. 1 is a pictorial view of an engine having portions broken away to show internal components pertaining to the invention.

Referring first to FIG. 1 of the drawings in detail, numeral 10 generally indicates an internal combustion engine having a single cylinder bank 12 with a plurality of cylinders 14. The cylinders are closed by a cylinder head 16 having a plurality of intake valves 18 for admitting intake charges to the cylinders and a plurality of exhaust valves 20 for discharging exhaust gases from the cylinders. The intake valves 18 are actuated by intake cams 22 of an intake camshaft 24. The exhaust valves 20 are actuated by exhaust cams 26 carried by an exhaust camshaft 28.

Both camshafts are rotatably mounted in the cylinder head and are driven by the engine crankshaft 30 through a chain 32 driving intake and exhaust sprockets 34, 36 drivingly connected with the intake and exhaust camshafts 24, 28 respectively. The exhaust sprocket 36 incorporates a cam phaser 38 which is operable to vary the angular position or phase of the exhaust camshaft over a predetermined angular range from its initial position for normal operation.

Figure 2:
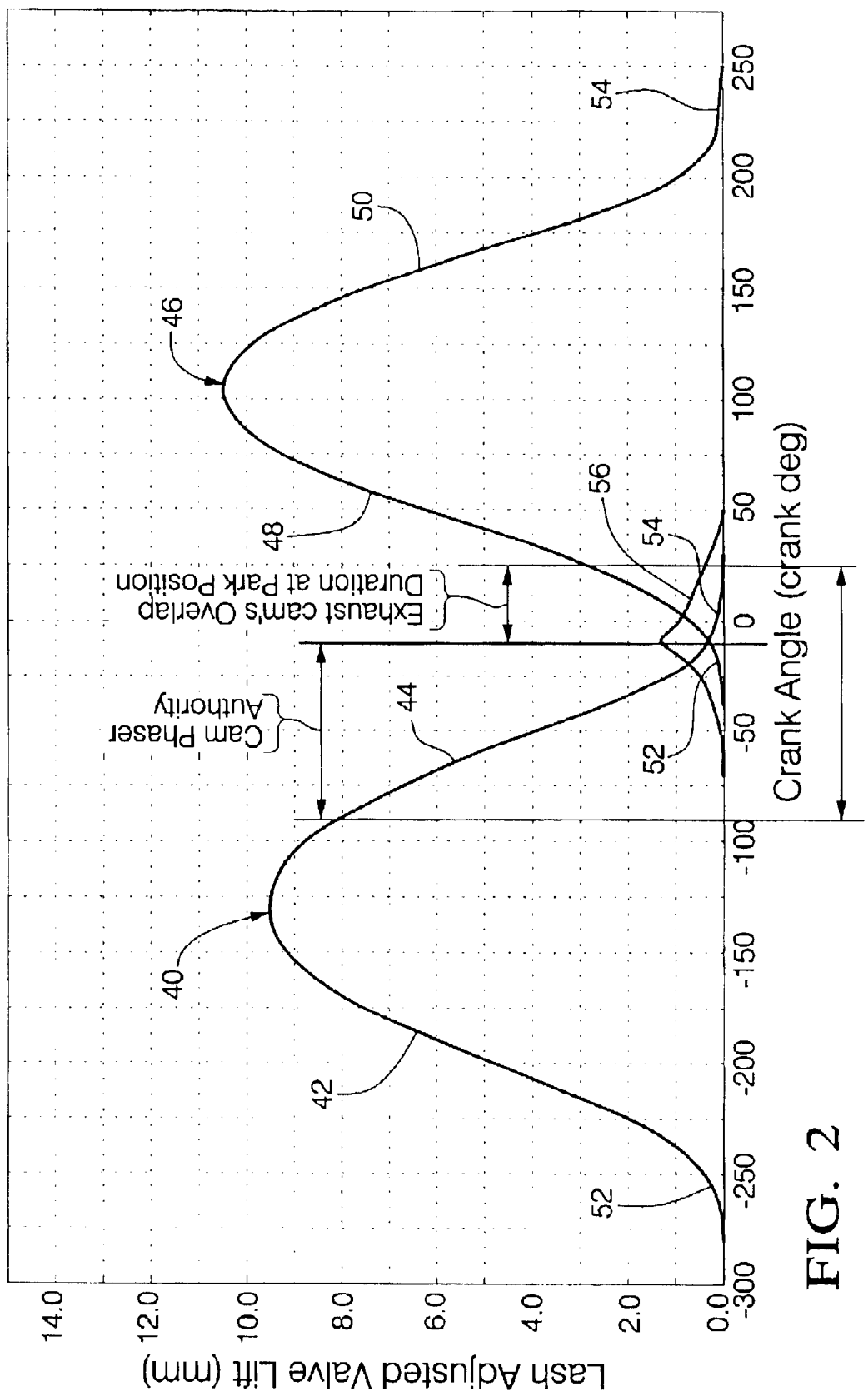
FIG. 2 is a diagram showing the lift curves, or opening and closing curves, for exhaust and intake cams in a conventional timing arrangement.

FIG. 2 illustrates an exemplary cam lift diagram of a conventional engine wherein the lift curve 40 of an exhaust cam includes an opening curve 42 and a closing curve 44 and the lift curve 46 of an intake cam similarly includes an opening curve 48 and a closing curve 50. It is noted that the curves 40, 46 begin and end with relatively shallow acceleration and deceleration portions 52, 54 which rapidly connect upward with their corresponding opening and closing curves that have more or less exponentially increasing slopes for rapid opening and closing of the valves.

Figure 3:
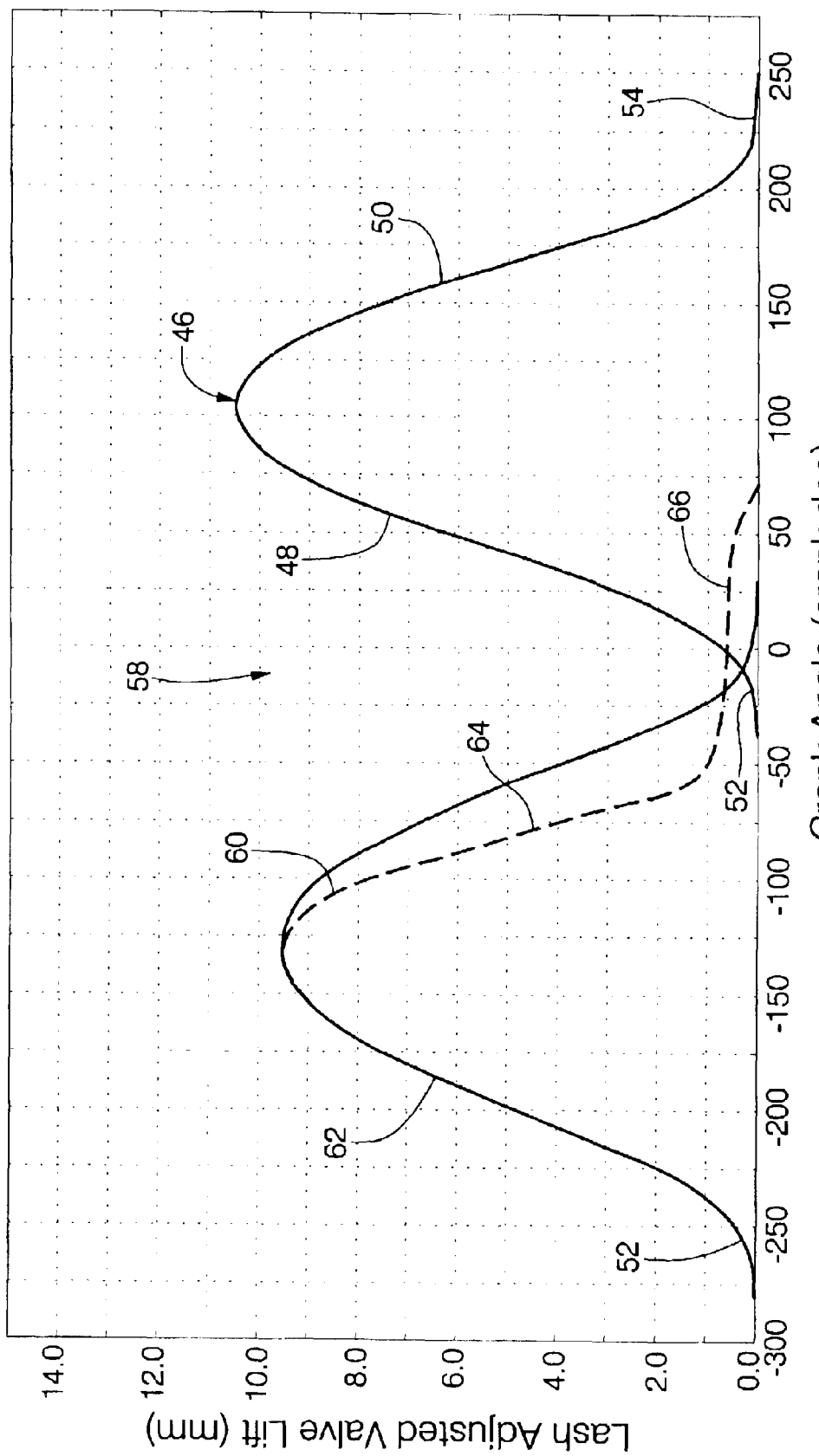
FIG. 3 is a diagram similar to FIG. 2 but showing the lift curves of an engine having an exhaust cam modified in accordance with the invention.
Figure 4:
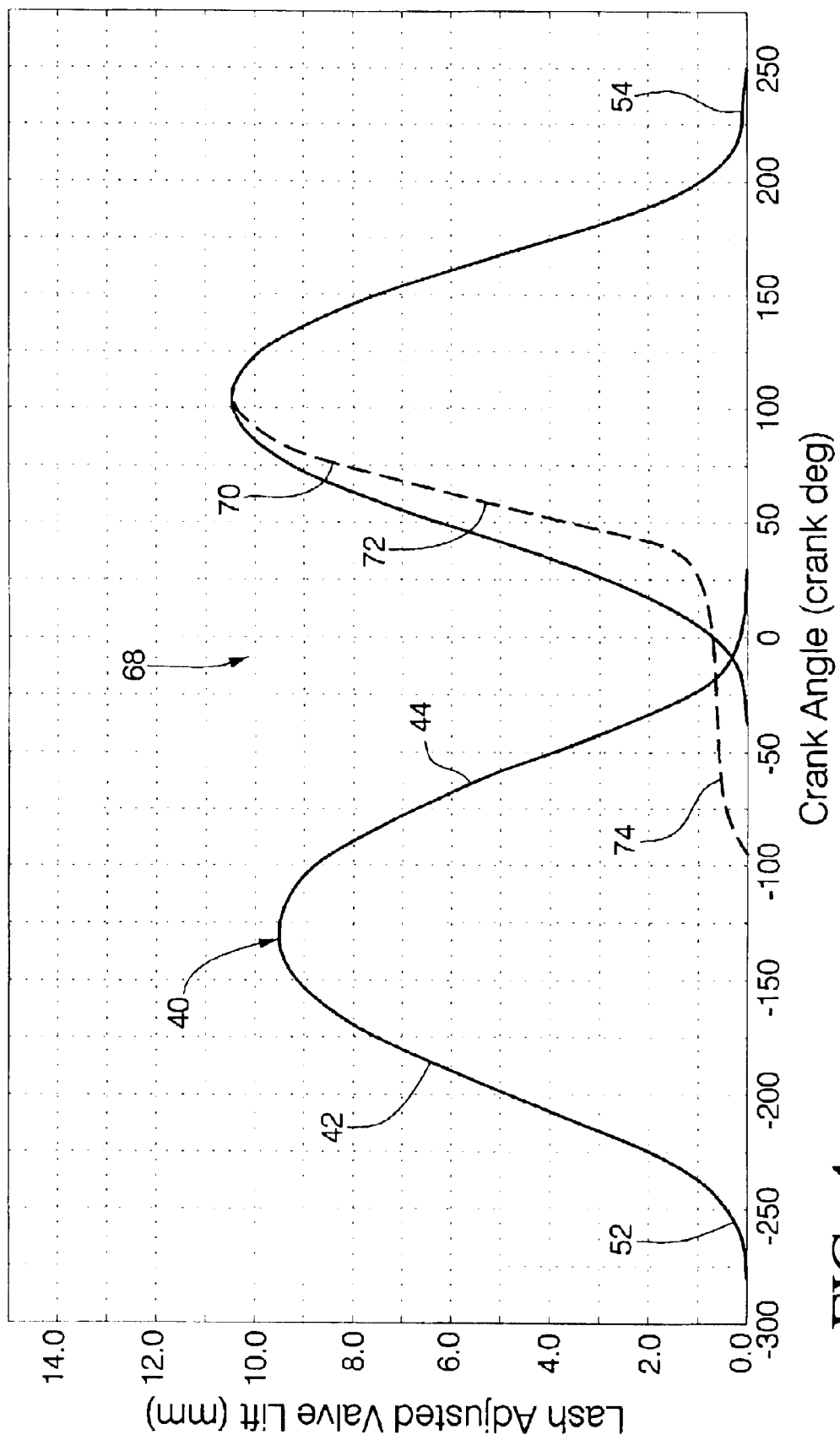
FIG. 4 is a view similar to FIGS. 2 and 3 but showing the lift curves of a camshaft with the inlet cam modified in accordance with the invention.

"Overlap area," as used herein, indicates the cumulative area of overlapping valve lift over the crank angle of the overlap period indicated on a valve timing diagram, as shown for example in FIGS. 2–4 of the drawings. The overlap area may thus be expressed in mm-degrees. "Overlap centerline" indicates a selected point in time when both valves are open an equal amount.

In conventional fixed timing of inlet and exhaust cams for overall engine operation, the deceleration portion 54 of the exhaust curve 40 overlaps the acceleration portion 52 of the intake cam 46 for only about 50° of engine crank angle rotation. At the overlap centerline, both valves are open only about 0.3 millimeters. The result is a relatively small valve overlap area which is shown enlarged by curve 56 of FIG. 2 and represents the relatively small period in which transferring of exhaust gases from the exhaust valve ports to the intake valve ports may occur.

If the engine is provided with a cam phaser which allows the phase angle of the exhaust cam to be retarded up to 80°, for example, it will be seen that increasing the overlap in crank angle degrees will rapidly increase the overlap area for exhaust gas retention (EGR) as the intersection of the valve curves rises rapidly due to the sharp upward angle of the intersecting curves 44, 48. With a maximum retard of 80°, it appears that the valve overlap area would increase at an increasing rate to about 10 times the initial overlap area.

The result is that any significant retarding of the exhaust cam phase angle results in a rapid increase in EGR which makes it difficult to control EGR with a reasonable degree of accuracy and to accommodate variations between engines without reaching the point in some engines where instability results. Accordingly, calibration of controls involving the phase angle change must be conservative in order to avoid combustion instability. This results in the inability to provide as much EGR flow as might be desirable under many engine conditions.

Referring now to FIG. 3 of the drawings, numeral 58 represents a modified pair of valve lift curves formed according to the invention to reduce the control problems previously indicated. In FIG. 3, the intake cam lift curve 46 is maintained the same as in the standard embodiment of FIG. 2. However, a new exhaust cam lift curve 60 is provided having an opening curve 62 which merges downward into a closing curve 64 advanced a predetermined crank angle, for example about 50°, from the conventional closing curve 44 of FIG. 2. From a valve lift in the neighborhood of 1 millimeter, the closing curve levels out into an extended EGR overlap curve 66 having a shallow downward slope for a predetermined phase angle from, for example, about 75° to 100°, after which the valve is closed with a conventional deceleration closing curve.

As a result of this modification, angular adjustments of the cam phaser 38 of FIG. 1 move the opening curve 62 closer to or further from the intake cam curve 46. However, because of the nearly horizontal or slightly downward sloped angle of the overlap curve 66, the change in the overlap area of the valves is relatively linear until the exhaust cam closing curve 64 approaches the opening curve 48 of the intake cam 46. During this variation in overlap then, the valve overlap area varies relatively linearly over the range of phase angles during which the overlap occurs.

Accordingly, the change in EGR flow with the variation in phase angle becomes a more or less linear function of the change in phase angle as opposed to the exponential function resulting from the standard or conventional valve timing arrangement of FIG. 2. In this way, the control of EGR flow is more easily accommodated since sudden changes in the EGR flow are essentially eliminated and a generally linear function is provided.

FIG. 4 represents an alternative embodiment of modified cam curves 68 similar to FIG. 3 but wherein the exhaust cam curve 40 follows the conventional mode and a modified intake cam lift curve 70 is provided. Its opening curve 72 is modified to include an initial extended overlap curve 74 and the angular position of the opening curve 72 is retarded, up to 50° or so, to provide for an extended generally linear area of overlap similar to that of the embodiment of FIG. 3. In this latter arrangement, the cam phaser could be located on the intake camshaft to vary the angular phase of the intake cam lift curve 70.

As alternatives to the forgoing, the embodiment of FIG. 3 could be operated utilizing a cam phaser controlling the intake cam while the exhaust cam remains in a fixed angular position but includes the extended overlap curve 66 as shown. The result would still allow an extended period of generally linear overlap area which would give an approximately linear EGR function relative to the angular change in the intake cam position.

Conversely, the embodiment of FIG. 4 could be operated with the cam phaser on the exhaust cam while the intake cam remains fixed but includes the extended overlap curve 74 so that the effect on the linear overlap again remains the same.

Finally, it should be noted that the same or similar results could be obtained if extended overlap areas were provided on both the exhaust and intake cams so that again an extended overlap period is provided which varies essentially linearly with adjustment of either or both of the cams through cam phasers.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An engine including cams for actuating intake and exhaust valves controlling transport of air and combustion products to and from a combustion chamber of the engine, the cams having valve opening and closing curves capable of being timed so that the intake valve opening curve partially overlaps the exhaust valve closing curve, allowing retention of some combustion products in the combustion chamber with an incoming air charge, at least one of the cams having variable timing to vary the valve overlap for controlling the amount of exhaust gas retention, wherein:

overlapping portions of the cam opening and closing curves provide a relatively linear change in valve overlap area over an extended range of duration of cam variable timing and the timing of the intake valve is variable and the opening curve of the intake cam provides the extended overlap area;

whereby variation of exhaust gas retention in the combustion chamber is a relatively constant function of the variation in duration of valve overlap in each engine cycle.

2. An engine as in claim 1 wherein the timing of the exhaust valve is variable.

3. An engine as in claim 1 wherein the extended overlap area is provided by an angular extension of at least one of the exhaust and intake cam curves overlapping the other, the extension having a near constant lift dimension over the extent of the angular range of valve overlap.

4. An engine as in claim 3 wherein the extension has a slight downward slope from the full lift curve toward the outer end of the extension.

5. An engine including cams for actuating intake and exhaust valves controlling transport of air and combustion products to and from a combustion chamber of the engine, the cams having valve opening and closing curves capable of being timed so that the intake valve opening curve partially overlaps the exhaust valve closing curve, allowing retention of some combustion products in the combustion chamber with an incoming air charge, at least one of the cams having variable timing to vary the valve overlap for controlling the amount of exhaust gas retention, wherein:

overlapping portions of the cam opening and closing curves provide a relatively linear change in valve overlap area over an extended range of duration of cam variable timing and the timing of both the intake and exhaust valves is variable and the overlapping curves of the intake and exhaust cams provide the extended overlap area;

whereby variation of exhaust gas retention in the combustion chamber is a relatively constant function of the variation in duration of valve overlap in each engine cycle.

6. An engine including cams for actuating intake and exhaust valves controlling transport of air and combustion products to and from a combustion chamber of the engine, the cams having valve opening and closing curves capable of being timed so that the intake valve opening curve partially overlaps the exhaust valve closing curve, allowing retention of some combustion products in the combustion chamber with an incoming air charge, at least one of the cams having variable timing to vary the valve overlap for controlling the amount of exhaust gas retention, wherein:

overlapping portions of the cam opening and closing curves provide a relatively linear change in valve overlap area over an extended range of duration of cam variable timing and the timing of the intake valve is variable and the closing curve of the exhaust cam provides the extended overlap area;

whereby variation of exhaust gas retention in the combustion chamber is a relatively constant function of the variation in duration of valve overlap in each engine cycle.

\* \* \* \* \*